United States Patent

Itoh et al.

[11] Patent Number: 5,841,838
[45] Date of Patent: Nov. 24, 1998

[54] TELEPHONE ANSWERING UNIT WITH CALLER IDENTIFICATION AND MESSAGE RECORDING FUNCTION

[75] Inventors: Shingo Itoh, Komaki; Junji Hatamura, Nagoya, both of Japan

[73] Assignee: Brother Kogyo Kabushiki Kaisha, Nagoya, Japan

[21] Appl. No.: 559,114

[22] Filed: Nov. 16, 1995

[30] Foreign Application Priority Data

| Nov. 17, 1994 | [JP] | Japan | 6-283674 |
| Nov. 17, 1994 | [JP] | Japan | 6-283675 |
| May 10, 1995 | [JP] | Japan | 7-111884 |

[51] Int. Cl.⁶ .................................................. H04M 1/64
[52] U.S. Cl. .............................. 379/67; 379/142; 379/355
[58] Field of Search .................................. 379/67, 70, 79, 379/80, 81, 88, 89, 93, 96, 127, 142, 216, 350, 354, 355, 372, 387, 93.01, 93.05, 93.17, 93.23; 395/2.42, 2.79, 2.81, 2.84; 704/233, 270, 272, 275

[56] References Cited

U.S. PATENT DOCUMENTS

| 4,241,238 | 12/1980 | Strand | 379/142 |
| 5,238,818 | 8/1993 | Klausner et al. | 379/67 |
| 5,390,236 | 2/1995 | Klausner et al. | 379/67 |
| 5,394,445 | 2/1995 | Ball et al. | 379/67 |
| 5,446,785 | 8/1995 | Hirai | 379/142 |
| 5,467,385 | 11/1995 | Reuben et al. | 379/88 |
| 5,481,594 | 1/1996 | Shen et al. | 379/67 |
| 5,526,424 | 6/1996 | Karnowski | 379/355 |
| 5,581,599 | 12/1996 | Tsuji et al. | 379/63 |
| 5,604,791 | 2/1997 | Lee | 379/67 |

FOREIGN PATENT DOCUMENTS

| 4-000846 | 1/1992 | Japan | 379/142 |

*Primary Examiner*—Scott L. Weavers
*Attorney, Agent, or Firm*—Oliff & Berridge, PLC

[57] ABSTRACT

In a versatile telephone unit subjected to a caller's telephone number reception service wherein at least a caller's telephone number is transmitted to a telephone unit prom a switchboard via a telephone line, the telephone unit has a caller's telephone number displaying feature allowing the user to know who telephoned while the user is absent or away from the telephone. When a call signal from a remote telephone is detected a predetermined number of times, the caller's telephone number transmitted with the call signal from the switchboard is stored in a memory. When the telephone is in an automatic answering mode, the caller's telephone number is stored in the memory along with incoming message. The caller's telephone number stored in the memory can be displayed on a display while reproducing the incoming message if any. A determination of whether an incoming message contains voice is performed and if no voice is determined to be recorded then the incoming message is erased from memory and the device indicates the associated telephone number has no voice recording.

21 Claims, 7 Drawing Sheets

TELEPHONE ANSWERING UNIT WITH CALLER IDENTIFICATION AND MESSAGE RECORDING FUNCTION

BACKGROUND OF THE INVENTION

1. Field of the Invention

The present invention relates to a versatile telephone unit subjected to a caller's telephone number reception service wherein a caller's telephone number is transmitted to a telephone unit from a switchboard via a telephone line.

2. Description of the Related Art

There has been known a conventional telephone unit with an automatic answering function. When the telephone unit is set to an automatic answering mode, the telephone automatically connects the telephone line in response to a call signal transmitted over the telephone line from a remote telephone. The telephone then outputs a preset response message and then records any message that comes from the remote telephone. Upon returning, the user can reproduce caller's messages recorded during the user's absence.

However, the telephone unit will not record messages when the user forgets to set the telephone unit to the automatic answering mode. Even if the user sets the telephone unit to the automatic answering mode, the telephone unit can only record a message when a caller leaves one.

When a caller leaves a message requesting a return call, the user of the telephone must look up the caller's telephone number, either in an address book or a phone book. In some cases the user may have no recollection of the caller, and so has no way to even look up the caller's telephone number.

Japanese Patent Publication (Kokai) No. HEI-1-59783 describes a telephone unit that displays, on a display, a caller's telephone number sent with the most recent call signal. The telephone unit is provided with a special button that, when depressed, causes the telephone number displayed on the display to be automatically dialed.

With such an automatic dialing feature, the user can dial the caller who most recently called. However, user can only dial the telephone number that is presently being displayed on his or her telephone unit. The user will have no way of knowing who telephoned if more than one person telephoned while he or she was away from the telephone. Therefore, the user cannot return calls to all the callers. Also, because only the caller's telephone number is displayed, when the user does not recognize whose telephone number is being displayed, he or she might inadvertently return a call from a wrong number or worse yet a prank call.

SUMMARY OF THE INVENTION

It is an object of the present invention to overcome the above-described problems accompanying the conventional telephone unit and provide a telephone unit capable of determining who telephoned while the user is absent or away from the telephone.

It is another object of the present invention to provide a telephone unit with an automatic answering function that allows a user to easily telephone people who called while the user was away from the telephone.

To achieve the above and other objects, there is provided, in accordance with one aspect of the invention, a versatile telephone unit which includes call signal detection means for detecting a call signal from a remote telephone. The call signal is transmitted over a telephone line via a switchboard. The telephone unit further includes a memory medium, first response control means for connecting a line to the remote telephone, and second response control means. The second response control means automatically connects the line to the remote telephone, automatically transmits a preset response message to the remote telephone, automatically stores in the memory medium an incoming message from a caller after transmission of the preset response message is completed, and then automatically disconnects the line from the remote telephone. The first response control means and the second response control means are selectively activated when the call signal detection means detects the call signal. There is provided storage control means which when the first response control means is activated, stores in the memory medium a caller's telephone number transmitted with the call signal from the switchboard when the call signal detection means detects the call signal a predetermined number of times. When the second response control means is activated, the storage control means stores in the memory medium the caller's telephone number in correspondence with respective incoming message. There are further provided a display, and display control means for displaying on the display the caller's telephone number stored in the memory medium. There are further provided reproduction means for audibly reproducing the incoming message stored in the memory medium, and reproduction control means for causing the reproduction means to reproduce the incoming message corresponding to the caller's telephone number being displayed on the display.

It is preferable that first determination means is further provided for determining, when the second response control means is activated, whether or not a voice is included in the incoming message from the caller, and deletion means for erasing the incoming message from the memory medium when the first determination means determines that a voice is not included in the incoming message.

It is also preferable that second determination means is further provided for determining whether or not the incoming message corresponding to the caller's telephone number displayed on the display is stored in the memory medium.

Categorization display control means may further be provided for, based on determination made by the second determination means, classifying caller's telephone numbers stored in the memory medium into a first category group relating to caller's telephone numbers for voice containing incoming messages and a second category group relating to caller's telephone numbers for voiceless incoming messages. The First category group is displayed on the display separately from the second category group.

It is also preferable to provide automatic dialing means which after or while the reproduction means reproduces the incoming message, transmits the caller's telephone number corresponding to the incoming message to the switchboard to call a corresponding remote telephone. In addition to the automatic dialing means, registration means may be provided which after or while the reproduction means reproduces the incoming message, registers the caller's telephone number corresponding to the incoming message in connection with an abbreviation number so that the registered caller's telephone number can be called by entering the abbreviation number.

In accordance with another aspect of the invention, there is provided a versatile telephone unit connectable to a switchboard with a telephone line wherein the unit receives a caller's telephone number and a caller's name from the switchboard over the telephone line. The telephone unit includes memory medium, storage control means or sequentially storing in the memory medium a caller's telephone number and corresponding caller's name both transmitted with a call signal from the switchboard over the telephone line, a display, and display control means for displaying on the display the caller's telephone number and the corresponding caller's name stored in the memory means. The display control means displays the caller's name preceding the caller's telephone number.

The telephone unit is also applicable to a circumstance where the unit receives from the switchboard a telephone number, a caller's name corresponding to the telephone number, and a time when called.

BRIEF DESCRIPTION OF THE DRAWINGS

The above and other objects, features and advantages of the invention will become more apparent from reading the following description or the preferred embodiment taken in connection with the accompanying drawings in which.

DETAILED DESCRIPTION OF THE PREFERRED EMBODIMENTS

A telephone unit according to a preferred embodiment of the present invention will be described while referring to the accompanying drawings.

Figure 1:
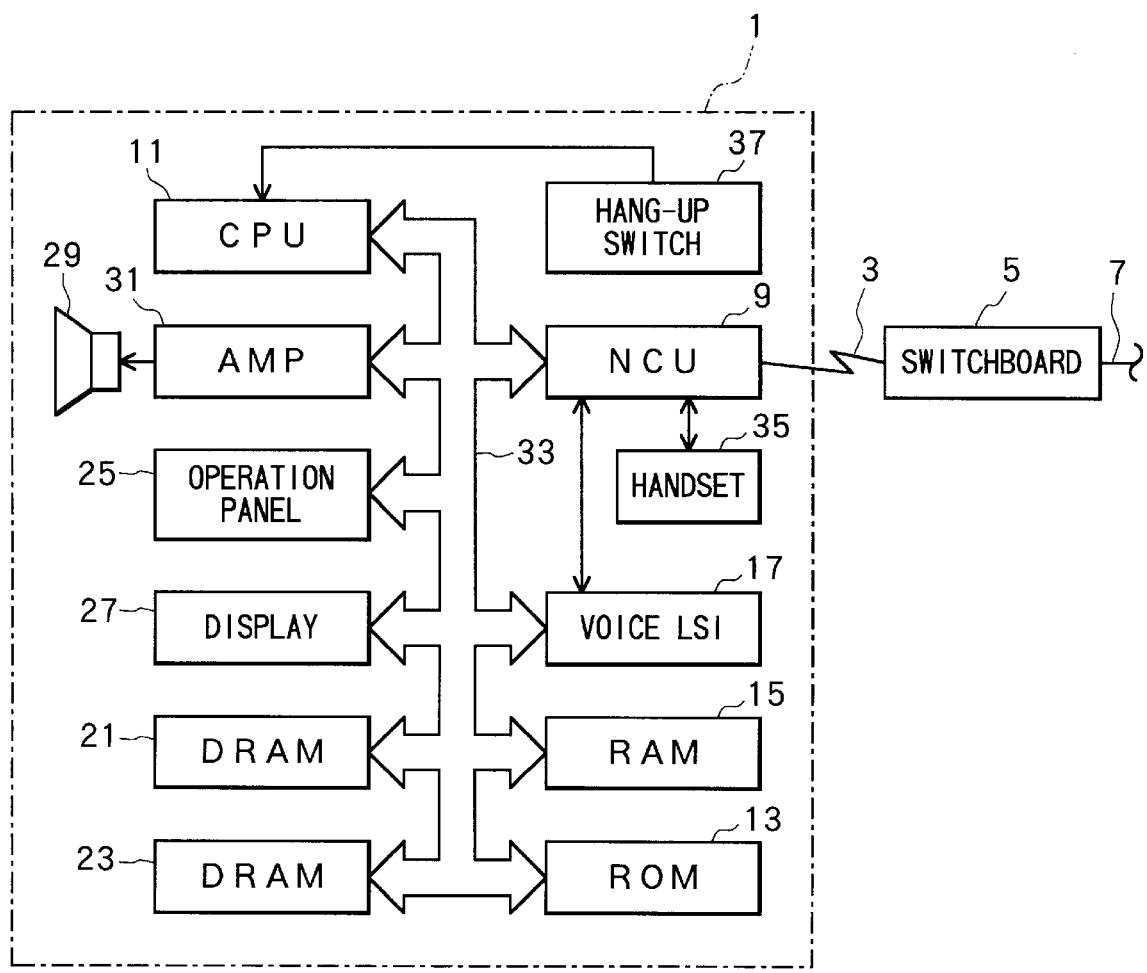
FIG. 1 is a block diagram showing configuration of electrical components in a telephone unit according to an embodiment of the present invention.

The present embodiment is directed to a telephone unit 1 with an automatic answering function. FIG. 1 is a block diagram showing configuration of electrical components in the telephone unit 1. A telephone line 3 connects the telephone unit 1 to a switchboard 5. A telephone line 7 connects the switchboard 5 to another switchboard that is not shown in the drawings. When a caller dials the telephone number of the telephone unit 1, a call signal is intermittently inputted to the telephone unit 1 via the switchboard 5. The telephone unit 1 is preregistered at the switchboard 5 as a subscriber to a caller's telephone number reception service wherein the caller's telephone number is transmitted to telephone unit 1 via the switchboard 5 during the silent interval between the first and the second call signals. Such a service is being employed in the United States.

The telephone unit 1 includes a circuit controlling network controller unit (NCU) 9, a CPU 11, a ROM 13, and a RAM 15. The NCU 9 is for connecting the telephone unit 1 to the telephone line 3. When a message is incoming to the telephone unit 1, the NCU 9 receives call signals, the caller's telephone number, and busy signals, which are transmitted from the switchboard 5 when the caller hangs up the telephone at his or her end. A handset 35 is connected to the NCU 9. Then a message is to be transmitted from the telephone unit 1, the NCU 9 transmits a dial signal according to the number dialed at the telephone unit 1. Further, the NCU 9 receives and transmits analog voice signals during a telephone call. The CPU 11 is for executing various control processes (to be described later). A hang-up switch 37, which turns off when the handset 35 is lifted from its cradle, is connected to the CPU 11. The ROM 13 is for storing control programs executed by the CPU 11. The RAM 15 is for temporarily storing results of calculations performed in the CPU 11.

The telephone unit 1 further includes a voice LSI 17, two dynamic RAMs (DRAM) 21 and 23, an operation panel 25, a display 27, and an amplifier 31, all connected to each other by a data bus 33. The voice 17 converts analog voice signals received by the NCU 9 into digital voice signals and also converts digital voice signals generated in the telephone unit 1 to analog voice signals and outputs resultant analog signals to the NCU 9.

The DRAM 21 serves as a memory medium for storing various data including data constituting an outgoing message to be transmitted to a caller when the telephone unit 1 is set to the answering mode, data constituting incoming messages transmitted from callers, and data constituting caller's telephone numbers. The DRAM 23 stores telephone numbers that can be automatically dialed through one touch dialing or abbreviated dialing (speed dialing).

The operation panel 25 includes various keys such as a plurality of number keys for dialing telephone numbers; a mode switch key for switching the operation mode of the telephone unit 1 between an automatic answering mode, wherein the answering machine function is executed, and an at-home mode, wherein the answering machine function is not executed; a telephone book key for registering telephone numbers for automatic dialing; a redial key for causing the most recently dialed telephone number to be automatically redialed; and a play key for causing reproduction of incoming messages stored in the DRAM 21.

The display 27 serves as a display means for displaying various messages and telephone numbers. The amplifier 31 is for amplifying signals, such as call signals and incoming messages, and outputting them to a speaker 29 connected to the amplifier 31.

Next, transmission operations normally performed by the telephone unit 1 will be briefly explained. The CPU 11 detects, via the NCU 9, that the handset 35 is off the cradle and the hang-up switch 37 is turned off. Then, a selection signal according to keys pressed on the operation panel 25 by a user are outputted to the NCU 9. The selection signal from the NCU 9 is transmitted over the telephone circuit 3 to the switchboard 5 and another telephone is called.

Next, reception operations normally performed by the telephone unit 1 will be briefly explained. The CPU 11 detects, via the NCU 9, an incoming call signal. Upon detecting this call signal, the CPU outputs a predetermined call tone to the amp 31, which outputs it to the speaker 29. If at this time the CPU 11 detects that the handset is in the cradle, that is, that the hang-up switch 37 is turned off, then the CPU 11 causes the NCU 9 to connected the telephone circuit 3 so that a telephone call can be made using the handset 35.

Next, an explanation of processes performed by the CPU 11 when the telephone unit 1 is set to the automatic answering mode using the mode switching key will be provided while referring to FIGS. 2 through 7.

Figure 2:
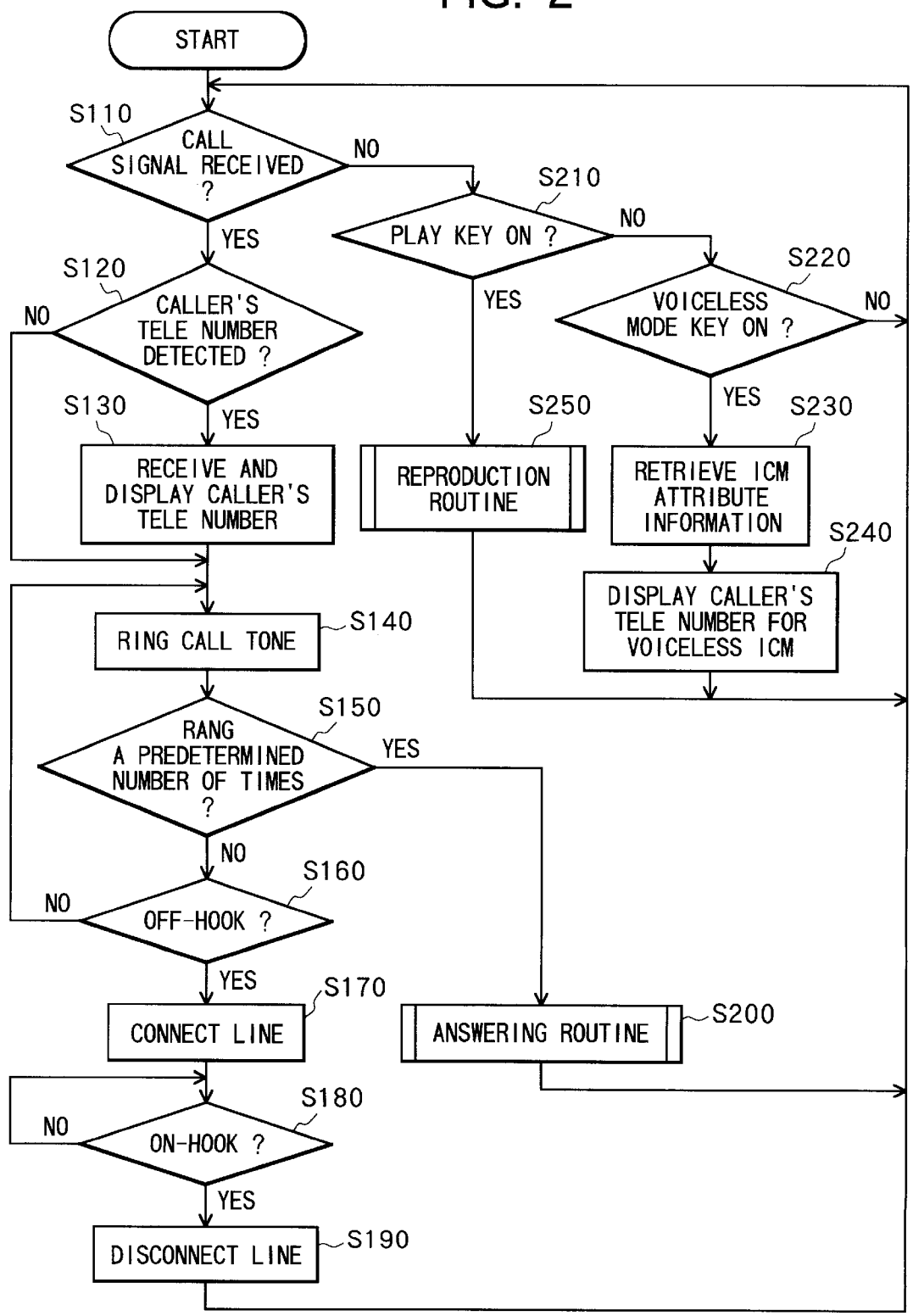
FIG. 2 is a flowchart representing a main program executed while the telephone unit is in an automatic answering mode.

FIG. 2 shows a flowchart representing overall process performed during the automatic answering mode. Steps in flowcharts of the drawings will hereinafter be referred to as Si (wherein i=110, 120, 130, . . . i). In S110, whether or not a call signal has been received is determined, if so (S110:YES), whether or not a caller's telephone number was transmitted with the call signal is determined in S120. It should be noted that the telephone unit 1 does not sound a call tone for the first incoming call signal. If the telephone unit 1 sounds the call tone too soon, the user might pick up the handset 35 before the caller's telephone number is transmitted during the silent interval between the first and the second call signal. This would prevent the display of the caller's telephone number, which is performed in a manner to he described later, if a caller's telephone number is detected (S120:YES), then the caller's telephone number is received and temporarily stored in the RAM 15 and the caller's telephone number is displayed on the display 27.

After the processes of S130 have been completed, or when it is determined in S120 that no caller's telephone number was transmitted with the call signal, then in S140 output of a call tone from the speaker 29 is performed in association with the presently received call signal. Next, whether or not the call tone has been sounded a predetermined number of times is determined in S150. If not (S150:NO), then whether or not the handset 35 is off the cradle or not is determined in S160. If not, (S160:NO), then the program returns to S140, whereupon S140 through S160 are repeated.

If it is detected in S160 that the handset 35 is off the cradle (S160:YES), then the NCU 9 connects the telephone circuit 3 in S170. That is, when the user picks up the handset 35 before the telephone unit 1 rings a predetermined number of times, then the telephone circuit 3 is connected so that a telephone call can be made using the handset 35.

After the telephone circuit 3 is connected, the program waits for the user to terminate the telephone call by determining in S180 whether or not the user replaces the handset 35 back on the cradle so that the hang-up switch 37 is turned on. When the user terminates the call (S180:YES), the telephone circuit 3 is disconnected in S190, and the program returns to S110 where another incoming call signal is awaited.

On the other hand, when it is determined in S150 that the call tone has been rung the predetermined number of times (S150:YES), then an answering routine for automatically answering a caller are performed. Afterward, the program returns to S110. The answering routine performed in S200 will be described while referring to the flowchart in FIG. 3. At the start of this routine, the telephone circuit 3 is connected in S310. Then, an outgoing message prestored in the DRAM 21 is outputted to the telephone circuit 3 via the voice LSI 17 and the NCU 9.

Next, whether or not the outgoing message has been transmitted is determined in S330. If not (S330:NO), whether or not the handset 35 has been picked up is determined in S340. If not (S340:NO), then the program returns to S330, whereupon S330 and S340 are repeated. When the handset 35 has been picked up (S340;YES), transmission of the outgoing message is terminated and a telephone call is made possible in S350. Then, the program waits for the user to hang-up the handset 35 by determining in S360 whether or not the handset 35 has been replaced in the cradle. When the user hangs up the handset 35 (S360:YES), the telephone circuit 3 is disconnected in S370 and the program returns to S110. In summary, when the user picks up the handset 35 while the outgoing message is being transmitted, the telephone circuit 3 is connected so that the user can transmit verbal messages using the handset 35.

Figure 3:
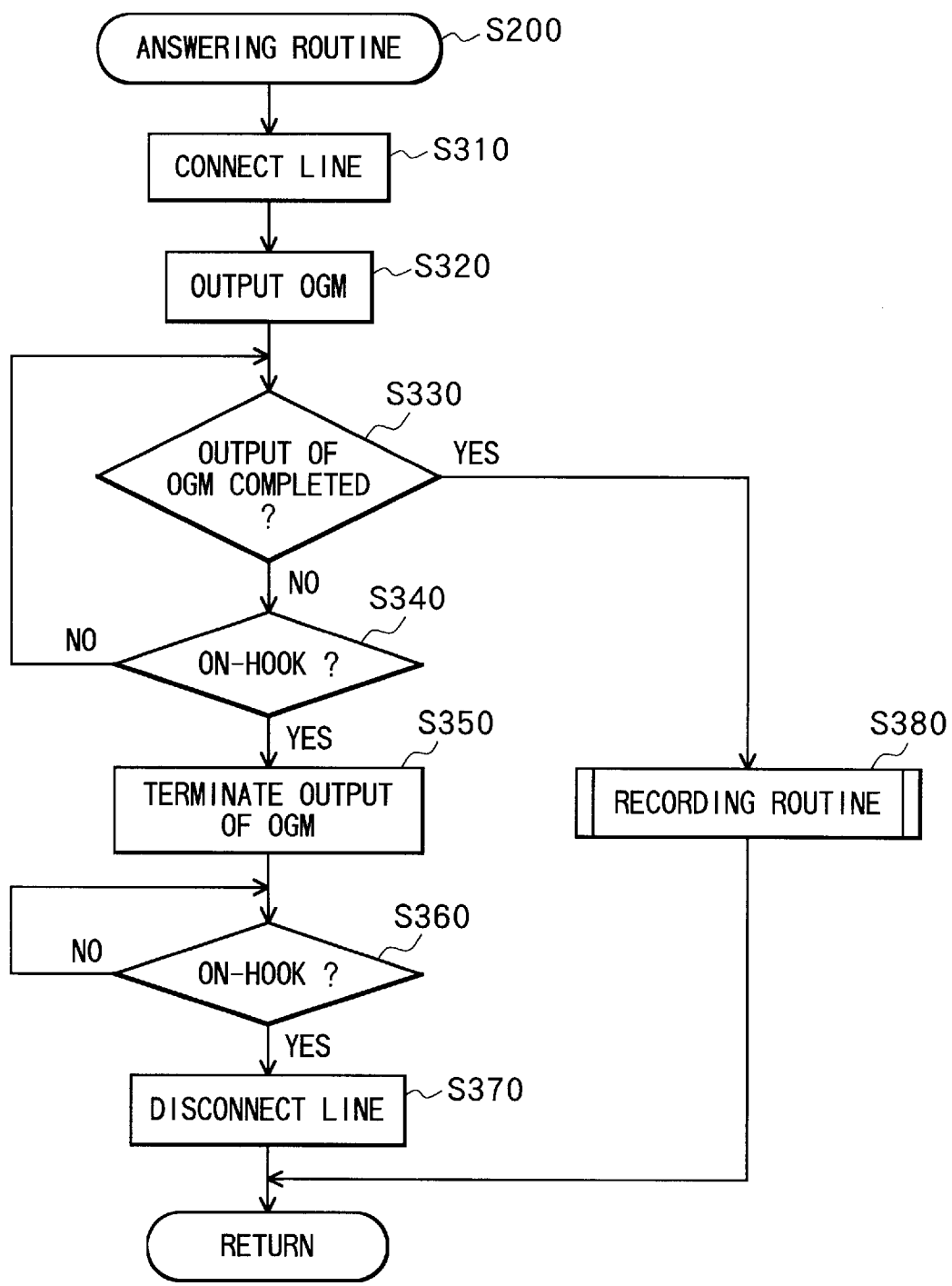
FIG. 3 is a flowchart representing an answering routine of the main program represented by the flowchart in FIG. 2.
Figure 4:
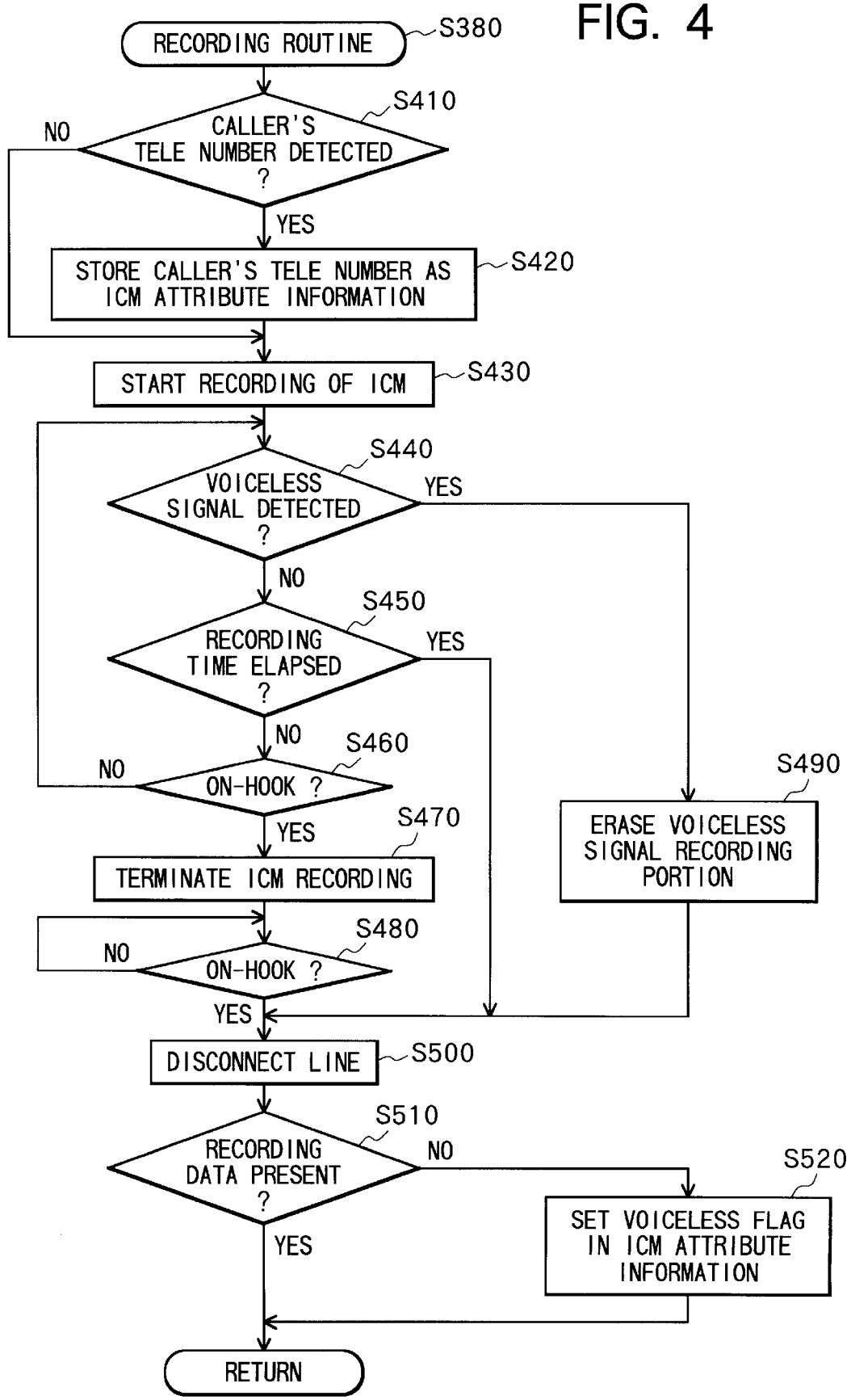
FIG. 4 is a flowchart representing a recording routine of the answering routine represented by the flowchart in FIG. 3.

When it has been determined that the outgoing message has been transmitted (S330:YES), then a recording routine represented by the flowchart in FIG. 3 is performed in S380 for recording any incoming message sent by the caller. When this routine is started, whether or not the caller's telephone number was received in S130 and stored in the RAM 15 is determined in S410. If so (S410:YES), then in S20 the caller's telephone number is stored in the DRAM 21 in a one-to-one correspondence with any incoming message recorded from the caller.

When S410 determines that no caller's telephone number has been received or when the processes of S420 are completed (S410:NO), then recording or any incoming message coming over the telephone circuit 3 is started in S430. The NCU 9 receives an analog voice signal from the caller and the voice LSI 17 converts it into a digital voice signal. The data of the digital voice signal is when stored as recording data in the DRAM 27.

Next, whether or not a voice was lacking from the incoming message for a predetermined duration of time or longer is determined in S440. Stated differently, S440 serves as a determination means for determining whether or not during recording a voiceless signal continues for a predetermined duration or time or longer. Examples of voiceless signals include silent signals that contain no sound whatsoever, continuous monotonic signals, or busy signals or other cyclically repeating monotonic signals. An affirmative determination will result in S440 if a voiceless signal situation continues for a predetermined duration of time or longer.

If in S440 it is determined that a voiceless signal situation has not continued for a predetermined duration of time or longer (S440:NO), then whether or not a predetermined recording time has elapsed is determined in S450. If not (S450:NO), then whether or not the handset 35 has been picked up is determined in S460. If not (S460:NO), then the program returns to S440, whereupon S440, S450, and S460 are repeated until one results in an affirmative determination. If the handset 35 is determined to be picked up (S460:YES), then processes for recording the incoming message are terminated and a telephone conversation using the handset 35 is made possible in S470. Then the program waits for the user to hang up the handset 25 in S480. In summary, when the user picks up the handset 35 while an incoming message is being recorded, the recording processes are terminated and the user can use the handset 35 to hold a conversation with the caller.

On the other hand, when a voiceless signal is determined to have continued for the predetermined period of time or longer (S440:YES), then the program proceeds to S490, which serves as a deletion leans, where the voiceless signal portion of the recording data is deleted from the DRAM 21. When the incoming message contains only a voiceless signal that continues for the predetermined duration of time or longer, no recording data for an incoming message will be stored in the DRAM 21. However, an incoming message that was recorded will be stored in the DRAM 21.

After the deletion processes of S490 are completed, or when either S450 or S480 result in an affirmative determination, then the program proceeds to S500, where the telephone circuit 3 is disconnected. Then S510, which serves as a second determination means, determines whether or not recording processes of the recording routine resulted in recording data of an incoming message being stored in the DRAM 21. If so (S510:YES), then the program returns to S110. If not (S510:NO), then a voiceless flag of incoming message attribute information such as a caller's telephone number, is set in S520. Then the program returns to S110. The voiceless flag indicates that an incoming message was once recorded but that all the recording data for the incoming message was erased from the DRAM 21 because the message was only a voiceless signal that continued from the start for the predetermined period of time or longer.

On the other hand, if no call signal is detected in S110 shown in the flowchart of FIG. 2 (S110:NO), then whether or not the play key of the operation panel 25 is on is determined in S210. If not (S210:NO), then whether or not a voiceless mode key provided to the operation panel 25 has been operated is determined in S220. If not (S220:NO), then the program returns to S110.

If in S220 the voiceless mode key is determined to have been pressed (S220:YES), then the incoming message attribute information, that is, the voiceless flag and the caller's telephone number, is retrieved from the DRAM 21 in S230. Then, in S240, which serves as a classification means, caller's telephone numbers that correspond to incoming messages to which a flag was set in the above-described recording routine, that is, caller's telephone numbers that correspond to incoming messages for which no reproducible recording data remains in the DRAM 21, are sorted out and displayed on the display 27. The telephone unit 1 could be designed so that pressing the voiceless key once would cause all the caller's telephone numbers that correspond to incoming messages for which no recording data remains to be automatically displayed one after the other. Alternatively, the telephone unit 1 could be designed so that only one caller's telephone number would be displayed each time the button is depressed. In this case, repeatedly pressing the button would result in all the caller's telephone numbers being displayed one after the other on the display 27.

Figure 5:
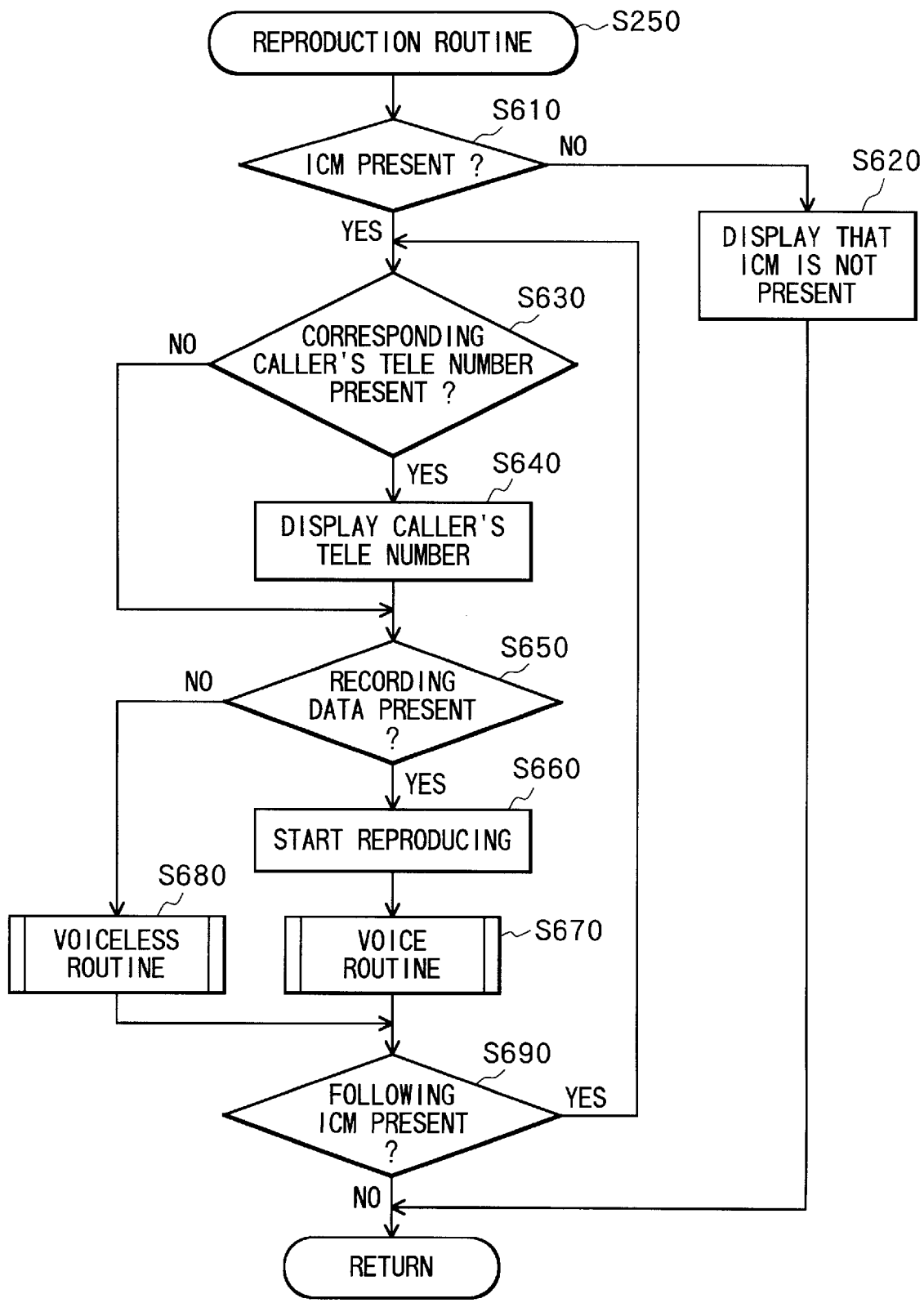
FIG. 5 is a flowchart representing a reproduction routine of the main program represented by the flowchart in FIG. 2.

On the other hand, when it is determined in S210 that the play key has been depressed (S210:YES), then in S250, the reproduction routine represented by the flowchart in FIG. 5 is executed. In this reproduction routine, which serves as a reproduction control means, the incoming messages recorded during the recording routine are played one after the other and the caller's telephone number that corresponds to the presenting reproduced incoming message is displayed on the display 27. At the start of the reproduction routine, whether or not any incoming messages that where recorded in the recording routine are present is determined in S610. In the determination of S610, incoming messages set with a voiceless flag are also considered as incoming messages. When no incoming messages were recorded (S610:NO), then a message to this affect is displayed on the display 27. Afterward the program returns to S110.

On the other hand, when at least one incoming messages was recorded (S610;YES), then it is determined whether or not a caller's telephone number corresponding to the incoming message under consideration is recorded in the DRAM 21. If so (S630:YES), then the caller's telephone number is displayed on the display 27 in S640, which serves as a display control means.

After completion of processes in S640, or Wheel S630 results in a negative determination (S630:NO), then whether or not recording data of an incoming message exists in the DRAM 21 is determined in S650 by checking for voiceless flags in correspondence with the subject incoming message. If recording data is determined to be stored in the DRAM 21 (S650:YES), then processes for reproducing the recording data are started in S660 which serves as a reproduction means.

Figure 6:
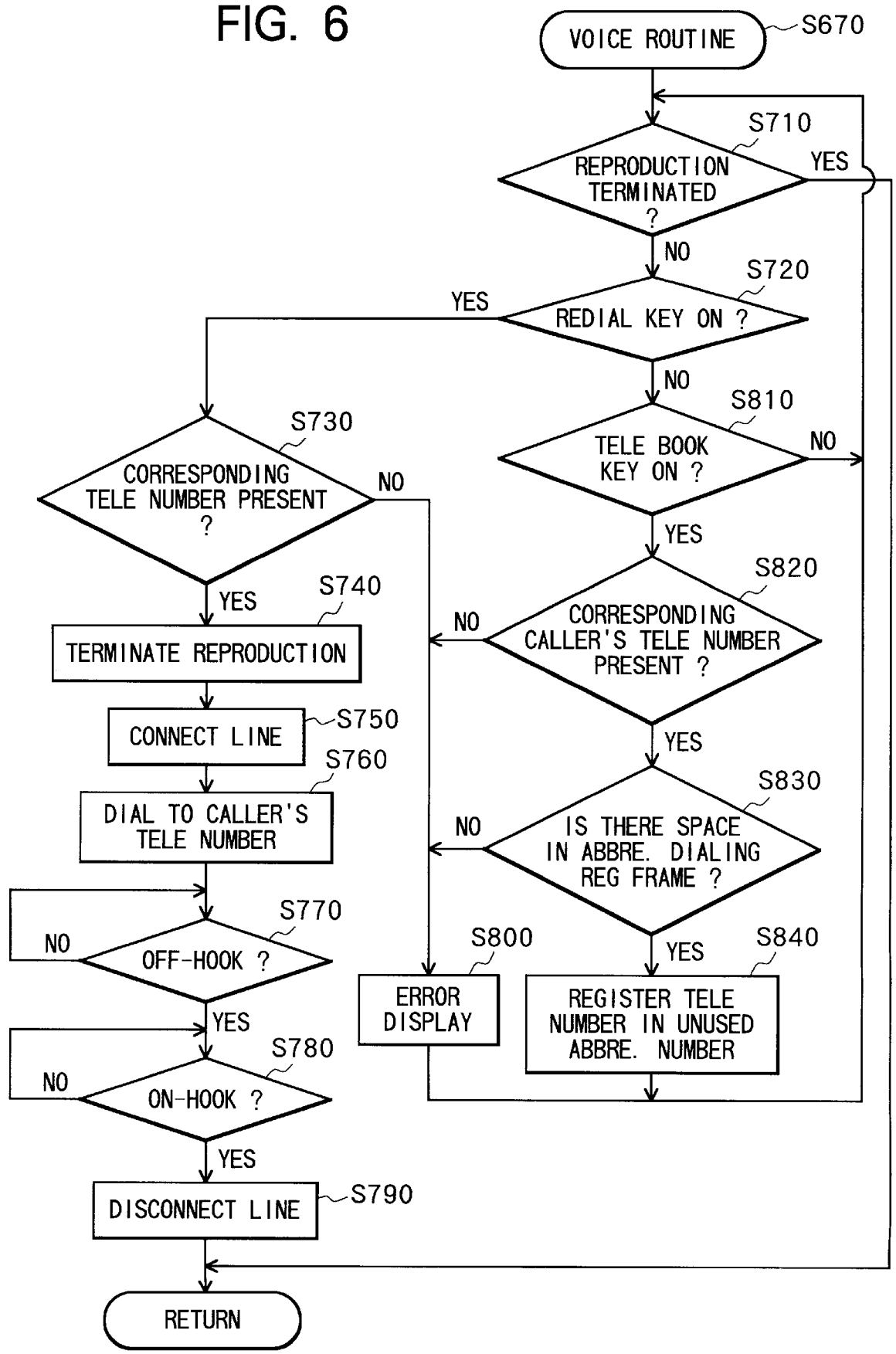
FIG. 6 is a flowchart representing a voice routine of the reproduction routine represented by the flowchart in FIG. 5.

Then, a voice routine represented by the flowchart in FIG. 6 is executed in S670. First, whether or not the recording data of all incoming messages has been reproduced is determined in S710. If so (S710:YES), then the program proceeds to S690 of the reproduction routine. If recording data of all incoming messages has not been reproduced (S710:NO), then whether or not the redial key of the operation panel 25 is turned on is determined in S720. If so (S720:YES), then whether or not a caller's telephone number that corresponds to the subject incoming message presently being played is stored in the DRAM 21 is determined in S730.

If a caller's telephone number that corresponds to the subject incoming message is stored in the DRAM 21 (S730:YES), then reproduction of the subject incoming message is terminated in S790. Next, the telephone circuit 3 is connected in S570 and the caller's telephone number that corresponds to the subject incoming message presently being reproduced is dialed in S760, which serves as an automatic dial means. Then the program waits for the user to pick up the handset 35 in S770. That is, the processes in S750 through S770 are performed while the handset 35 is placed in the cradle of the telephone unit 1.

When it is determined that the handset 35 has been picked up (S770:YES), then the user can have a conversation using the handset 35 until it is determined in S780 that the handset 35 has been replaced in the cradle of the telephone unit 1. When it is detected that the handset has been replaced (S780:YES), then the telephone circuit is disconnected in S790 and the program returns to S690 of the reproduction routine.

If it is determined in S730 that no caller's telephone number that corresponds to the subject incoming message is stored in the DRAm 21 (S730:NO), then an error message, which in this case says that the number can not be dialed, is displayed on the display 27 in S800. Then the program returns to S710.

On the other hand, if it is determined in S720 that the redial key is not turned on (S720:NO), then whether or not the telephone book key of the operation panel 25 is on is determined in S810. If not (S810:NO), then the program proceeds to S670 of the reproduction routine. If the telephone book key of the operation panel 23 is on (S810;YES), then, in the same manner as in S730, whether or not the caller's telephone number that corresponds to the subject incoming message presently being reproduced is determined in S820. It so (S820:YES), then whether or not there is space in the abbreviated dialing registration frame is determined in S830. If so (S830:YES), then in S840 the caller's telephone number that corresponds to the subject incoming message presently being reproduced is registered in correspondence with the smallest unused abbreviation number as a telephone number that can be automatically redialed. Then the registered telephone number and the abbreviation number are displayed on the display 27 and the program returns to S710.

When either S820 or S830 results in a negative determination, that is, when either it is determined that no caller's telephone number that corresponds to the subject incoming message is stored in the DRAM 21 (S820:NO), or that no empty space remains in the abbreviated dial registration frame (S830:NO), then the program proceeds to S800, where an error message, which in this case says that the number can not be registered, is displayed on the display 27. Then the program returns to S710.

In summary, when, during the voice routine, the redial key is depressed during reproduction of an incoming message, then the caller's telephone number that corresponds to the subject incoming message is dialed so that the user can easily telephone whoever telephoned while he or she was away from the telephone unit 1. When the telephone book key is depressed while an incoming message is being reproduced, then the caller's telephone number that corresponds to the subject incoming message is registered, with an unused abbreviation number, as the telephone number for abbreviated dialing. In this way, the user can easily make a telephone call by operating the automatically registered abbreviation number.

Figure 7:
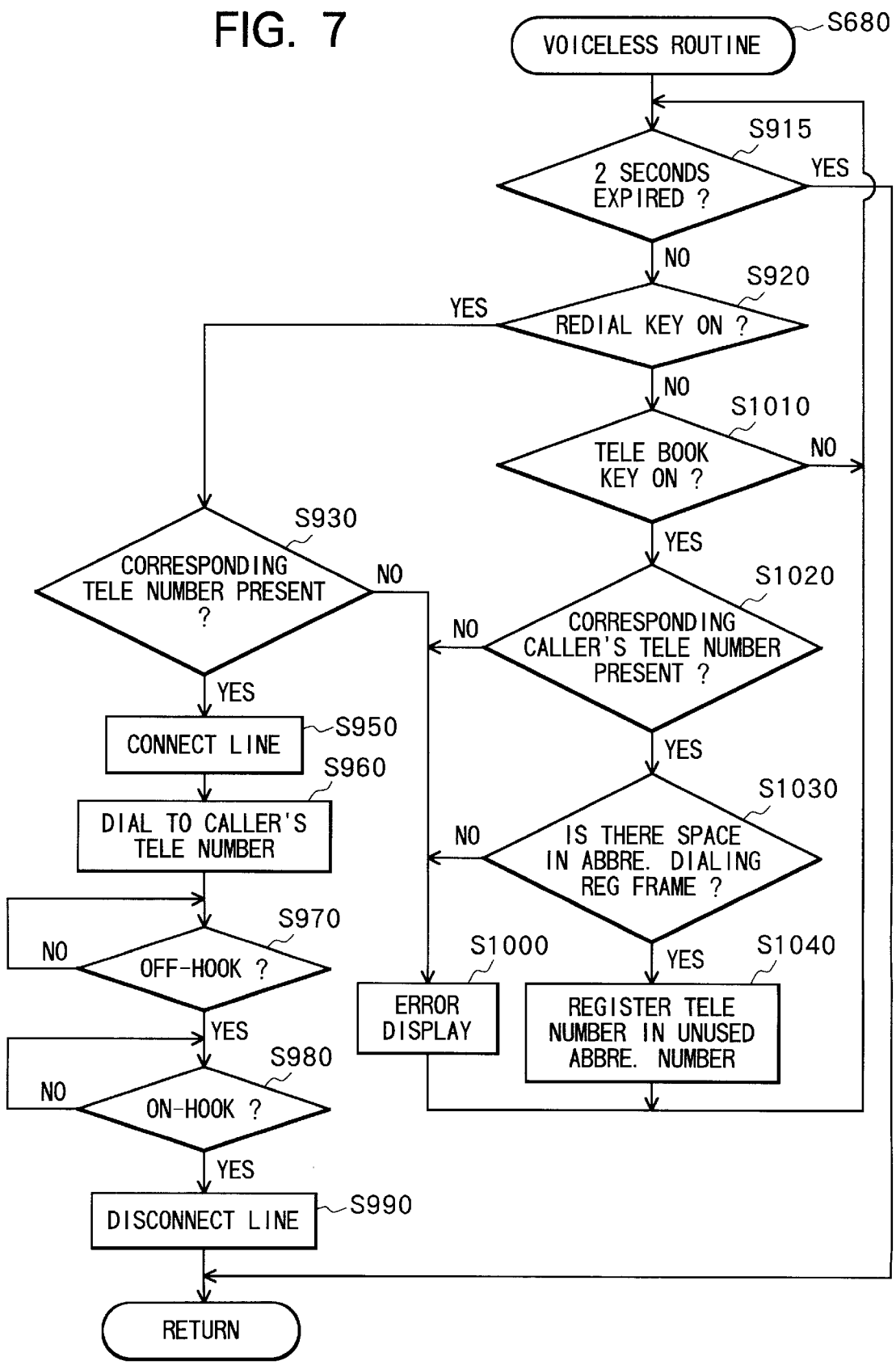
FIG. 7 is a flowchart representing a voiceless routine of the reproduction routine represented by the flowchart in FIG. 5.

On the other hand, if it is determined in S650 of the reproduction routine that no recording data for the subject incoming message presently being reproduced is stored in DRAM 21 (S650:NO), then a voiceless routine represented by the flowchart in FIG. 7 is executed in S680. The voiceless routine of S680 is similar to the voice routine of S670. Steps of the voiceless routine are numbered by adding 200 to numbering of corresponding steps in the voice routine, that is, to steps wherein the same processes are performed. The voiceless routine differs from the voice routine in that reproduction of an incoming message is not started before execution of the voiceless routine. Therefore, processes performed in S710 of the voice routine, that is, processes for determining whether or not reproduction has been completed, are not performed during the voiceless routine. Instead, at the start of he voiceless routine, whether or not two seconds have elapsed is first determined in S915. Similarly, there is no need to perform the processes of S740 of the voice routine, that is, processes for terminating reproduction of an incoming message. Therefore, a caller's telephone number, that corresponds to the subject incoming message, is determined in S930 of the voiceless routine to be stored in the DRAM 21 (S930:YES), then the telephone circuit 3 is immediately connected in S950.

Accordingly, when the redial key is depressed (S920:YES), then the caller's telephone number that corresponds to the subject incoming message is dialed in S950 and S960. When the telephone book key is depressed (S1010:YES), then the caller's telephone number that corresponds to the subject incoming message is registered in S1040 as a telephone number in correspondence with an unused abbreviation number.

As shown in FIG. 5, when processes of the voice routine in S670 are completed, or when processes of the voiceless routine in S680 are completed, then whether or not data for a subsequent incoming message remains in the DRAM 21 is determined in S690. If so (S690:YES), the program returns to S630, whereupon the processes of S630 through S690 are repeated until S690 results in a negative determination. Then the program returns to S110.

It should be noted that telephone unit 1 could be designed so that each caller's telephone number stored in the DRAM 21 can be manually erased by operating a predetermined deletion key or automatically erased after once being reproduced.

As described above, when the telephone unit 1 is not set to the automatic answering mode, each caller's telephone number is stored in S420 in the DRAM 21 in correspondence with sequentially stored incoming messages from callers. When the play key is depressed so that an incoming message is reproduced, then the caller's telephone number that corresponds to the subject incoming message is displayed on the display 27 in S640. Accordingly, even when a caller does not leave a message, the user can determine who called him or her by checking the caller's telephone number displayed on the display 27.

Also, in the telephone unit 1 or the present embodiment, recording data of any voiceless incoming message is erased from the DRAM 21 in S400 and S490. Accordingly, the DRAM 21 need not be provided with a large storage capacity, regardless of whether or not the telephone unit 1 is designed to store caller's telephone numbers.

Also, in the telephone unit 1 of the present embodiment, a voiceless flag is stored in S510 and S520 in the DRAM 21 with caller's telephone numbers that correspond to voiceless incoming messages. Pressing the voiceless mode key on the operation panel 25 cause all caller's telephone numbers stored with voiceless flags to be sequentially displayed in S220 through S240. Accordingly, the telephone unit 1 according to the present embodiment displays only telephone numbers of callers that did not leave messages so that the user can quickly know who called.

It was described in the embodiment that the caller's telephone number that corresponds to the subject incoming message being reproduced is displayed while the subject incoming message is being reproduced. Stated differently, the same command is used to command reproduction of the incoming message and to command display of the corresponding caller's telephone number. However, a special key can be provided to the operation panel 25 for commanding display of caller's telephone numbers stored in the DRAM 21. In this case, the stored caller's telephone numbers would be displayed one after another each time the special key was depressed. In this case also, by viewing the displayed telephone numbers, a user can determine who called even if callers do not leave a message.

It was described in the embodiment that when the telephone unit 1 is set to the automatic answering mode, then caller's telephone numbers are sequentially stored in the DRAM 21 so that the user can view them afterward. However, the telephone unit 1 could be designed to perform this function even when the telephone unit 1 is not set to the automatic answering mode. A predetermined key could be provided to the telephone unit 1 that, when depressed, causes display of the stored caller's telephone numbers. This affords the extra advantage that the user of the telephone unit 1 will be able to tell who called without the caller being charged for a call. Also, even if the user forgets to set the telephone unit 1 to the automatic answering mode, he or she will be able to tell who called while he or she was out, which would be extremely handy for business people. It should be noted that processes for storing caller's telephone numbers in the DRAM 12 would serve as a storage control means and processes for displaying the caller's telephone number upon depression of the special key would serve as a display control means.

As described above, when the telephone unit 1 is set to the automatic answering mode, each caller's telephone number is stored in S420 in the DRAM 21 in correspondence with sequentially stored incoming messages from callers. If, after the play key is depressed, the redial key is depressed while an incoming message is being reproduced (S720 or S920:YES), then the caller's telephone number that corresponds to the subject incoming message presently being reproduced is redialed in S760 or S960. Therefore, a user of the telephone unit 1 according to the present embodiment can easily call, that is, without looking any telephone numbers up in the telephone book, whoever telephoned during this or her absence. The user can also determine whether or not to telephone the caller after listening to the caller's message.

When the telephone book key is depressed while an incoming message is being reproduced (S810 or S1010:YES), then the caller's telephone number that corresponds to the subject incoming message presently being reproduced is registered in S840 or S1040 as a telephone number that can be automatically redialed using a one touch dialing or abbreviated dialing function. Accordingly, a user of the telephone unit 1 according to the present invention can easily register, as automatic dialing numbers, telephone numbers of callers who called while the user was away from the telephone. The user can then easily telephone the caller.

In S640 the telephone unit 1 according to the present embodiment displays the caller's telephone number that corresponds to the incoming message presently being reproduced. Therefore, the user can, after confirming the caller's telephone number, press the redial key and return the caller's call or press the telephone book key and register the caller's telephone number in the automatic dial registration frame. Even when the caller did not leave a message, the user can tell who called while he or she was out by merely viewing the caller's telephone number displayed on the display.

On the other hand, the telephone unit 1 according to the present embodiment deletes recording data for voiceless incoming messages from the DRAM 21 in S440 and S490. Therefore, a DRAM 1 with only a small memory capacity is sufficient even if the telephone unit 1 is designed to store caller's telephone numbers, The telephone unit 1 of the present embodiment is designed so that incoming messages stored in the DRAM 21 are automatically reproduced one after the other when the play key is depressed. Pressing the redial key redials, and pressing the telephone key registers as an automatic dial number, the caller's telephone number that corresponds to the incoming message being presently reproduced. However, the telephone unit 1 can be designed so that caller's telephone numbers can be redialed or registered as automatic dial numbers after the subject incoming message has been reproduced.

Each time a caller telephones, the telephone unit according to the present invention stores the caller's telephone number, which is transmitted with the call signal, and then commands display of the stored caller's telephone number on the display means. Therefore, even when a user receives a number or calls while away from the telephone, the user can tell who telephoned merely by viewing the displayed caller's telephone numbers.

According to the present invention, caller's telephone numbers are stored in a recording medium in correspondence with respective incoming messages from callers and are later displayed on a display. Therefore, even when a caller does not leave a message that tells the user who called, the user can tell who called by viewing the caller's telephone number.

Further, a caller's telephone number is displayed while its corresponding incoming message is being reproduced. Also, voiceless incoming messages are erased from the recording medium. Accordingly, a user can tell who called by viewing the caller's telephone numbers even if the callers did not leave a message. Memory capacity of the memory means is effectively used because voiceless incoming messages are automatically erased.

Furthermore, caller's telephone numbers are categorized into those corresponding to voiceless incoming messages, that is, to incoming messages for which data was erased, and those corresponding to incoming message stored in the memory medium. These two categories of incoming messages are displayed separately. Therefore, the user can tell which callers called but did not leave messages.

According to the present invention, caller's telephone numbers are stored one after the other in correspondence with incoming messages from the caller. If a dial command is inputted either during or after reproduction or an incoming message, then the telephone calls the caller of the incoming message by transmitting the caller's telephone number that corresponds to the incoming message over the telephone circuit.

A user of a telephone can easily telephone callers without looking up the caller's telephone number, for example, in a telephone bock. The user can first listen to the caller's message and then determine whether or not to return the caller's telephone call.

Moreover, incoming messages are stored in correspondence with caller's telephone numbers. A registration command inputted to the telephone during or after reproduction of an incoming message will cause registration, as an abbreviated telephone numbers, of the caller's telephone number that corresponds to the incoming message. Therefore, the user can easily register, as an abbreviated dial number, the telephone number of callers who called while the user was away from the telephone. The user can easily return calls of such callers.

Moreover, the telephone unit displays the caller's telephone number that corresponds to the incoming message presently being reproduced. Therefore, the user can view the display to confirm the caller's telephone number before returning the caller's call or registering the telephone number as an abbreviated telephone number.

While the invention has been described in detail with reference to specific embodiments thereof, it would be apparent to those skilled in the art that various changes and modifications may be made therein without departing from the spirit of the invention, the scope of which is defined by the attached claims.

For example, although in the embodiment various processes are performed to display caller's telephone numbers, processes can be easily modified to also display other caller information transmitted by the caller's telephone number reception service via the switchboard during the silent interval between the first and the second call signal. Examples of other information transmitted with the caller's telephone number include the caller's name and the time the incoming message arrived.

A user can more quickly know who called by viewing the caller's name than by viewing the caller's telephone number. Therefore, it is desirable to give priority to the caller's name over the caller's telephone number when displaying information on incoming messages. Here, an explanation will be provided for how the program represented by the flowcharts in the drawings can be modified to give the caller's name priority over the caller's telephone number. Processes in this modification are similar to those described in the embodiment, but are also performed on caller's names, times incoming calls arrived, and other information in addition to just the caller's telephone number.

For example S120 of the flowchart in FIG. 2 would need to be modified so that whether or not caller's telephone number, the caller's name, and time the incoming call arrived is received is determined. If so (S120:YES), then in S130 the caller's telephone number, the caller's name, and time the incoming call arrived are all temporarily stored in the RAM 15. Because a user would more easily recognize a caller's name than the caller's telephone number, the caller's name is preferably given priority and displayed on the display 27. If the caller's telephone number is received, but not the caller's name, hen the caller's telephone number is displayed in S130. If nothing is received (S120:NO), then the program proceeds to S140, where processes are performed as described above.

Also, S410 would need to be modified to determine whether or not the caller's telephone number, the caller's name, and time the incoming call arrived are stored in the RAM 15. If so (S410:YES), then, in S420, the caller's telephone number, the caller's name, and time the incoming call arrived are all stored in the DRAM 21 as attribute information that corresponds to the incoming message presently being recorded. When nothing has been received so that S410 results in a negative determination (S410:NO) or after the processes in S420 are completed, then the program proceeds to S430, where processes are performed as described above.

Because the incoming message attribute information includes the caller's name and time the incoming call arrived in addition to the caller's telephone number, S230 would need to be modified so that when it is determined in S220 that the voiceless mode key has been pressed (S220:YES), then the incoming message attribute information, that is, the voiceless flag, the caller's telephone number, the caller's name, and the time the incoming call arrived, are all retrieved from the DRAM 21 in S230. Then, in S240, of the caller's telephone numbers, caller's names, and times that correspond to incoming messages to which voiceless flags were set in the above-described recording routine, caller's names are given priority and displayed on the display 27. When a caller's name is not included in the incoming message attribute information, then the caller's telephone number is displayed on the display 27. The telephone unit 1 could be designed so that pressing the voiceless key once would cause all the caller's names that correspond to incoming messages for which no recording data remains to be automatically displayed one after the other. Alternatively, the telephone unit 1 could be designed so that only one caller's name would be displayed each time the button is depressed. In this case, repeatedly pressing the button would result in all the caller's name being displayed one after the other on the display 27.

On the other hand, when it is determined in S210 that the play key has been depressed (S210:YES), then in S250, which is the reproduction routine represented by the flowchart in FIG. 5, the incoming messages recorded during the recording routine are played one after the other and, of the caller's telephone number, he caller's name, and time that correspond to the incoming message presently being reproduced, the caller's name is given priority and displayed on the display 27.

More specifically, when at least one incoming message was recorded (S610:YES), then whether or not a caller's telephone number, a caller's name, time, and the like that correspond to the incoming message under consideration is recorded in the DRAM 21 is determined. If so (S630:YES), then the caller's name is given priority and displayed on the display 27 in S640, If the caller's name s not stored in the DRAM 21, then the caller's telephone number is displayed on the display 27.

The telephone unit 1 could be designed so that each time a cursor key is depressed, the caller's name, the caller's telephone number, and the time are displayed one after the other. This would allow the user to confirm the caller's telephone number, and the time the incoming message was recorded, while listening to the reproduction of the message left by the caller. After completion of processes in S640, or when S630 results in a negative determination (S630:NO), then the program proceeds to S650, where processes are performed as described above.

If it is determined in S810 of the flowchart shown in FIG. 6 that the telephone book key of the operation panel 25 is on (S810:YES), then whether or not he caller's telephone number, the caller's name, and the like that correspond to the subject incoming message presently being reproduced is determined in S820. If so (S820:YES), and if there is space in the abbreviated dialing registration frame (S830:YES), then in S840 the caller's telephone number, the caller's name, and the like that corresponds to the subject incoming message presently being reproduced is registered in correspondence with the smallest unused abbreviation number as a telephone number that can be automatically redialed. Then the registered telephone number, the caller's name, and the abbreviation number are displayed in order on the display 27 and the program returns to S710.

As described in the embodiment, the program will proceed to S800 when a negative determination is made in either S820 or S830. Then the program returns to S710.

With these modifications, by viewing the caller's name a user can snow who called more quickly and easily than by viewing the caller's telephone number. Also, by pressing the cursor keys, the user can gain information on when an incoming message arrived and the caller's telephone number.

Although these modifications were described in regards to the caller's names, caller's telephone number, and time, any other information transmitted from the switchboard could also be displayed. Instead of the information being displayed one after the other when the cursor key is depressed, all the information could be displayed at once if the telephone unit 1 is provided with a large display. Also, the information such as the caller's telephone number, the caller's name, and time the incoming call arrived stored in the DRAM 21 could be printed out in the form of a transmission report.

What is claimed is:

1. A versatile telephone unit comprising:

call signal detection means for detecting a call signal from a remote telephone, the call signal being transmitted over a telephone line via a switchboard;

a memory medium;

first response control means for connecting a line to the remote telephone;

second response control means for automatically connecting the line to the remote telephone, for automatically transmitting a preset response message to the remote telephone, and for automatically storing in said memory medium an incoming message from a caller after transmission of the preset response message is completed and then automatically disconnecting the line from the remote telephone, said first response control means and said second response control means being selectively activated when said call signal detection means detects the call signal;

storage control means for, when said first response control means is activated, storing in said memory medium a caller's telephone number transmitted with the call signal from the switchboard when said call signal detection means detects the call signal a predetermined number of times, and for, when said second response control means is activated, storing in said memory medium the caller's telephone number in correspondence with the incoming message;

a display;

display control means for displaying on said display the caller's telephone number stored in said memory medium;

reproduction means for audibly reproducing the incoming message stored in said memory medium, wherein the caller's telephone number is being displayed throughout the reproduction of the corresponding incoming message;

first determination means for determining, when said second response control means is activated, whether or not a voice is included in the incoming message from the caller; and deletion means for erasing the incoming message from said memory medium when said first determination means determines that a voice is not included in the incoming message.

2. A versatile telephone unit according to claim 1, further comprising reproduction control means or causing said reproduction means to reproduce the incoming message corresponding to the caller's telephone number being displayed on said display.

3. A versatile telephone unit according to claim 1, further comprising second determination means for determining whether or not the incoming message corresponding to the caller's telephone number displayed on said display is stored in said memory medium.

4. A versatile telephone unit according to claim 3, further comprising categorization display control means for, based on determination made by said second determination means, classifying caller's telephone numbers stored in said memory medium into a first category group relating to caller's telephone numbers for voice containing incoming messages and a second category group relating to caller's telephone numbers for voiceless incoming messages, and for displaying on said display the first category group separately from the second category group.

5. A versatile telephone unit according to claim 2, further comprising automatic dialing means for, after or while said reproduction means reproduces the incoming message, transmitting the caller's telephone number corresponding to the incoming message to the switchboard to call a corresponding remote telephone.

6. A versatile telephone unit according to claim 2, further comprising registration means for, after or while said reproduction means reproduces the incoming message, registering the caller's telephone number corresponding to the incoming message in connection with an abbreviation number so that the registered caller's telephone number can be called by entering the abbreviation number.

7. A versatile telephone unit connectable to a switchboard with a telephone line wherein said versatile telephone unit receives a caller's telephone number and a caller's name from the switchboard over the telephone line, the versatile telephone unit comprising:

a memory medium;

storage control means for sequentially storing in said memory medium the caller's telephone number and the corresponding caller's name both transmitted with a call signal from the switchboard over the telephone line;

a display;

a display control means for displaying on said display the caller's telephone number and the corresponding caller's name stored in said memory medium, said display control means giving priority to the caller's name over the caller's telephone number;

call signal detection means for detecting the call signal from a remote telephone;

first response control means for connecting the telephone line to the remote telephone;

second response control means for automatically connecting the telephone line to the remote telephone, for automatically transmitting a preset response message to the remote telephone, and for automatically storing in said memory medium an incoming message from the caller after transmission of the preset response message is completed and then automatically disconnecting the telephone line from the remote telephone, said first response control means and said second response control means being selectively activated when said call signal detection means detects the call signal;

first determination means for determining, when said second response control means is activated, whether or not a voice is included in the incoming message from the caller; and deletion means for erasing the incoming message from said memory medium when said first determination means determines that a voice is not included in the incoming message.

8. A versatile telephone unit according to claim 7, further comprising:

reproduction means for audibly reproducing the incoming message stored in said memory medium; and reproduction control means for causing said reproduction means to reproduce the incoming message corresponding to the caller's telephone number being displayed on said display, wherein the caller's telephone number is being displayed throughout the reproduction of the corresponding incoming message.

9. A versatile telephone unit according to claim 8, wherein when said first response control means is activated, said storage control means stores in said memory medium the caller's telephone number and the corresponding caller's name when said call signal detection means detects the call signal a predetermined number or times.

10. A versatile telephone unit according to claim 9, wherein when said second response control means is activated, said storage control means stores in said memory medium the caller's telephone number and the corresponding caller's name in correspondence with the incoming message.

11. A versatile telephone unit according to claim 10, further comprising second determination means for determining whether or not the incoming message corresponding to the caller's telephone number displayed on said display is stored in said memory medium.

12. A versatile telephone unit according to claim 11, further comprising categorization display control means for, based on determination made by said second determination means, classifying caller's telephone numbers stored in said memory medium into a first category group relating to caller's telephone numbers for voice containing incoming messages and a second category group relating to caller's telephone numbers for voiceless incoming messages, and for displaying on said display the first category group separately from the second category group.

13. A versatile telephone unit according to claim 8, further comprising automatic dialing means for, after or while said reproduction means reproduces the incoming message, transmitting the caller's telephone number corresponding to the incoming message to the switchboard to call a corresponding remote telephone.

14. A versatile telephone unit according to claim 8, further comprising registration means for, after or while said reproduction means reproduces the incoming message, registering the caller's telephone number corresponding to the incoming message in connection with an abbreviation number so that the registered caller's telephone number can be called by entering the abbreviation number.

15. A versatile telephone unit connectable to a switchboard with a telephone line wherein said versatile telephone unit receives a caller's telephone number, a caller's name, and a time when a call signal is received from the switchboard over the telephone line, the versatile telephone unit comprising:

call signal detection means for detecting the call signal from a remote telephone;

a memory medium;

first response control means for connecting the telephone line to the remote telephone;

second response control means for automatically connecting the telephone line to the remote telephone for automatically transmitting a preset response message to the remote telephone, and for automatically storing in said memory medium an incoming message from a caller after transmission of the preset response message is completed and then automatically disconnecting the telephone line from the remote telephone, said first response control means and said second response control means being selectively activated when said call signal detection means detects the call signal;

storage control means for sequentially storing in said memory medium the caller's telephone number, the corresponding caller's name, and a time when called;

a display;

display control means for displaying on said display the caller's telephone number, the corresponding caller's name and the time when called stored in said memory medium;

reproduction means for audibly reproducing the incoming message stored in said memory medium;

reproduction control means for causing said reproduction means to reproduce the incoming message corresponding to the caller's telephone number being displayed on said display, wherein the caller's telephone number is being displayed throughout the reproduction of the corresponding incoming message;

first determination means for determining, when said second response control means is activated, whether or not a voice is included in the incoming message from a caller; and deletion means for erasing the incoming message from said memory medium when said first determination means determines that a voice is not included in the incoming message.

16. A versatile telephone unit according to claim 15, wherein when said first response control means is activated, said storage control means stores in said memory medium the caller's telephone number, the corresponding caller's name, and the time when called when said call signal detection means detects the call signal a predetermined number of times.

17. A versatile telephone unit according to claim 16, wherein when said second response control means is activated, said storage control means stores in said memory medium the caller's telephone number, the corresponding caller's name and the Lime when called in correspondence with respective incoming message.

18. A versatile telephone unit according to claim 17, further comprising second determination means for determining whether or not the incoming message corresponding to the caller's telephone number displayed on said display is stored in said memory medium.

19. A versatile telephone unit according to claim 18, further comprising categorization display control means for, based on determination made by said second determination means, classifying caller's telephone numbers stored in said memory medium into a first category group relating to caller's telephone numbers for incoming messages containing voice and a second category group relating to caller's telephone numbers for voiceless incoming messages, and for displaying on said display the first category group separately from the second category group.

20. A versatile telephone unit according to claim 15, further comprising automatic dialing means for, after or while said reproduction means reproduces the incoming message, transmitting the caller's telephone number corresponding to the incoming message to the switchboard to call a corresponding remote telephone.

21. A versatile telephone unit according to claim 15, further comprising registration means for, after or while said reproduction means reproduces the incoming message, registering the caller's telephone number corresponding to the incoming message in connection with an abbreviation number so that the registered caller's telephone number can be called by entering the abbreviation number.

* * * * *